(12) United States Patent
Pandey et al.

(10) Patent No.: US 12,725,198 B2
(45) Date of Patent: Sep. 1, 2026

(54) SYSTEM AND METHOD FOR PROVIDING ONE OR MORE PHOTOREALISTIC SYNTHETIC IMAGES OF A RETAIL PRODUCT

(71) Applicant: JIO PLATFORMS LIMITED, Ahmedabad (IN)

(72) Inventors: Naveen Kumar Pandey, Pratapgarh (IN); Balakrishna Pailla, Alto Porvarim (IN); Shailesh Kumar, Hyderabad (IN); Abhinav Anand, Bhopal (IN); Dhruval Rana, Jaipur (IN); Ritesh Kumar, Patna (IN); JayaSaiKiran Patibandla, Vijayawada (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 42 days.

(21) Appl. No.: 18/722,384

(22) PCT Filed: Dec. 26, 2022

(86) PCT No.: PCT/IB2022/062785
§ 371 (c)(1),
(2) Date: Jun. 20, 2024

(87) PCT Pub. No.: WO2023/126817
PCT Pub. Date: Jul. 6, 2023

(65) Prior Publication Data

US 2025/0139689 A1 May 1, 2025

(30) Foreign Application Priority Data

Dec. 27, 2021 (IN) ............................ 202121060972

(51) Int. Cl.
*G06Q 30/0601* (2023.01)
*G06T 7/60* (2017.01)
(Continued)

(52) U.S. Cl.
CPC .......... *G06Q 30/0643* (2013.01); *G06T 7/60* (2013.01); *G06T 15/04* (2013.01); *G06T 15/503* (2013.01); *G06T 17/20* (2013.01)

(58) Field of Classification Search
CPC ................................................ G06Q 30/0643
See application file for complete search history.

(56) References Cited

U.S. PATENT DOCUMENTS

2019/0311424 A1* 10/2019 Malkosh .................. G06T 7/40
2020/0107008 A1 4/2020 Hur et al.
(Continued)

FOREIGN PATENT DOCUMENTS

IN 201941006171 A 8/2020
WO 2017217752 A1 12/2017
WO 2023277906 A1 1/2023

OTHER PUBLICATIONS

M. F. Hashmi, B. K. K. Ashish, A. G. Keskar, N. D. Bokde and Z. W. Geem, "FashionFit: Analysis of Mapping 3D Pose and Neural Body Fit for Custom Virtual Try-On," in IEEE Access, vol. 8, pp. 91603-91615, 2020 (Year: 2020).*
(Continued)

*Primary Examiner* — Michael Misiaszek
(74) *Attorney, Agent, or Firm* — FINNEGAN, HENDERSON, FARABOW, GARRETT & DUNNER LLP

(57) ABSTRACT

The present disclosure provides a robust and effective solution to an entity or an organization by enabling the entity to implement a system for 3D vision, and synthetic data generation of a retail product model. Further, the present
(Continued)

disclosure aims at generating high-quality, photorealistic, large-scale domain-specific synthetic data. The system is equipped with synthetic simulation, digital twin creation, and synthetic data generation with automated annotations. Additionally, the system allows the training of artificial intelligence to reduce manual efforts and to facilitate the automation and personalization.

10 Claims, 7 Drawing Sheets

(51) Int. Cl.

| | |
|---|---|
| ***G06T 15/04*** | (2011.01) |
| ***G06T 15/50*** | (2011.01) |
| ***G06T 17/20*** | (2006.01) |

(56) References Cited

U.S. PATENT DOCUMENTS

2021/0049811 A1* 2/2021 Fedyukov ................. G06T 7/60
2021/0118149 A1* 4/2021 Sollami ................ G06N 3/0464
2021/0174586 A1* 6/2021 Hillesland ............. G06T 19/003

OTHER PUBLICATIONS

International Search Report and Written Opinion for WIPO application No. PCT/IB2022/062785 dated Apr. 17, 2023, 10 pages.

* cited by examiner

400

SYSTEM AND METHOD FOR PROVIDING ONE OR MORE PHOTOREALISTIC SYNTHETIC IMAGES OF A RETAIL PRODUCT

RESERVATION OF RIGHTS

A portion of the disclosure of this patent document contains material, which is subject to intellectual property rights such as, but are not limited to, copyright, design, trademark, integrated circuit (IC) layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The present disclosure relates to a field of retail model synthesis, and more particularly, to a system and a method for providing a 3D vision-based approach to automatically create 3D models of retail products that generates high-quality, photorealistic, large-scale domain-specific retail synthetics.

BACKGROUND OF INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Retail Synthetics relates to a broader field of 3-dimensional (3D) vision and synthetic data generation and more specific to a subfield of retail artificial intelligence (AI) that aims at generating high-quality, photorealistic, large-scale domain-specific synthetic data. Be it an e-commerce business, retail super stores, or automated checkout systems, lot of effort has been deployed for product cataloguing, sortation, recommendations, product classification, fast checkout, and automation of various other sub-processes. Synthetic simulation, digital twin creation, and synthetic data generation with automated annotations allow a trained retail AI module to reduce the manual efforts and facilitate automation and personalization. Retail synthetics simulate the environment and create digital twins (3D models) of retail products without requiring depth sense camera red blue green, and depth data (RGBD data). Additionally, retail synthetics render millions of examples red blue green, and depth data (RGBD data) in order to create commercial off-the-self (COTS) retail-specific AI models for different tasks such as localization, segmentation, classification, and tracking. Recent literature studies show that one possible way to deal with the above-mentioned issues is to generate and use diverse and good quality synthetic data. As synthetic dataset can be generated to have different visual characteristics than real image datasets, it is a natural fit for large scale domain adaptation experiments.

In this regard, few approaches target on using depth sense cameras that capture RGBD image sequences of a product and perform 3D reconstruction using the RGBD data. Most of these approaches focus on creating 3D models based on multi-view RGBD data and Open3D or based on shape/volumetric embedding learning. Another set of methods try to use simulation engine user interface to create 3D models and generate synthetic images. However, most of these approaches fail in generating good quality synthetic data for retail products. Retail products are characterised by high intra-class and low inter-class variance exhibiting characteristics. The appearances of product classes vary specifically with different volumes, similar appearances, exact volumes, but different product classes.

However, there are many challenges observed in handling large scale retail products. Retail products exhibit large variety of products with different shape and sizes. The dimension of the retail products ranges from approximately 50 kilo gram (kg) packs to 0.1 kg products. Further, the variations are seen in different class of objects such as cuboidal, cubical, cylindrical, spherical, semi-spherical, and any combination of such shapes. Furthermore, the complexity increases in handling transparent objects and glossy items.

Additional challenges are observed in 3D model creations. Most of the available approaches suffer when the retail products are of very small size (5 grams to 100 grams products), or show complex variations (transparent and glossy items). 3D reconstruction of these products at such minute level is a complex task and state-of-the-art (SOTA) approaches often result in a poor quality 3D model which further affects the data generation process.

Further challenges in domain mapping include creating AI models. As proprietary and specific use-cases require understanding and mapping of the application domain, complexities may arise in domain mapping. Further, environment-level information must be passed into the simulation process in order to generate data that matches the domain distribution. Also, incorporating the camera poses, oblique angles, occlusions, illumination conditions, motion blur, and other such properties become a challenging task in synthetic data generation process.

Challenges are also observed in automated and scalable frameworks. The entire process of synthetic data generation includes various sub-processes such as product scanning, 3D modelling, domain adaptation, and rendering the data. Automating the entire process becomes a challenging task mainly because of the fact that each sub-process may use different algorithms, software, simulation, and rendering engines. Rendering such systems to be scalable to different environments, applications, tasks, and large-scale data production further complicates the problem.

There is, therefore, a need in the art to provide a system and a method that can mitigate the problems associated with the prior arts, and provide a data generation framework suitable for retail products.

OBJECTS OF THE INVENTION

Some of the objects of the present disclosure, which at least one embodiment herein satisfies are as listed herein below.

It is an object of the present disclosure to provide a system and a method that uses a 3D vision-based approach to automatically create 3D models (digital twins) of retail products.

It is an object of the present disclosure to provide a system and a method that incorporates domain randomization and in painting based techniques to blend products in different backgrounds specific to an application domain.

It is an object of the present disclosure to provide a system and a method that employs physics-based simulations for creating realistic 3D scenes by managing the products, occluding materials, and background, environmental conditions (illumination, blur, noise, orientation, pose, height, motion, etc.)

It is an object of the present disclosure to provide a system and a method that uses python-based pipeline (blender) for rendering high quality realistic synthetic data (RGB and depth images).

It is an object of the present disclosure to provide a system that supports automated annotation service for a variety of artificial intelligence/machine learning (AI/ML) tasks such as object detection, tracking, segmentation, and multi-class classification.

It is an object of the present disclosure to provide a system and a method that is user-friendly.

It is an object of the present disclosure to provide a system and a method that addresses data security and privacy concerns of conventional systems and methods.

It is an object of the present disclosure to provide a system and a method that is scalable.

It is an object of the present disclosure to provide a system and a method that provides good data quality while generating a low computational cost.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure relates to a system that may include one or more processors operatively coupled to one or more computing devices. The one or more processors may be coupled with a memory that stores instructions to be executed by the one or more processors. The one or more processors may be configured to receive one or more input parameters from the one or more computing devices using a configuration template. The one or more computing devices may be associated with one or more users and may be connected to the one or more processors through a network. The one or more input parameters may be indicative of one or more images of a retail product provided by the one or more users through the one or more computing devices. The one or more processors may extract a first set of attributes from the one or more input parameters, where the first set of attributes are indicative of one or more configuration parameters of the retail product. Additionally, the one or more processors may extract a second set of attributes based on the first set of attributes. The second set of attributes may be indicative of one or more retail product meshes based on the one or more configuration parameters of the retail product. Further, the one or more processors may extract a third set of attributes based on the second set of attributes. The third set of attributes may be indicative of one or more digital twins based on the one or more retail product meshes of the retail product. Based on the first set of attributes, the second set of attributes, and the third set of attributes, the one or more processors may generate a rendered model through an artificial intelligence (AI) engine. The AI engine may be configured to use one or more techniques to generate the rendered model. The one or more processors may generate one or more photorealistic synthetic images and one or more annotations for the retail product based on the rendered model.

In an embodiment, the one or more configuration parameters may include any or a combination of a product identification (ID), a product dimension, a product texture, a product class, and a product shape class.

In an embodiment, the product dimension may comprise any or a combination of a length, a width, and a height of the retail product.

In an embodiment, the product shape class may comprise any or a combination of a cube, a cuboid, a cone, a torus, a sphere, an oval, a cylinder, and a pyramid.

In an embodiment, the one or more processors may be configured to generate a texture map from the one or more retail product meshes and generate the one or more digital twins of the retail product based on the texture map.

In an embodiment, the one or more techniques used by the AI engine may comprise one or more alpha-blending based techniques that perform domain randomization of the one or more digital twins to generate the one or more photorealistic synthetic images and the one or more annotations of the retail product.

In an embodiment, the AI engine may be configured to generate one or more three-dimensional (3D) realistic scenes using the one or more alpha-blending based techniques. The AI engine may be also configured to simulate the one or more 3D realistic scenes to generate the one or more photorealistic synthetic images of the retail product.

In an embodiment, the one or more photorealistic synthetic images generated by the AI engine may comprise a red, green, and blue (RGB) image, a depth image, and one or more segmentation maps of the retail product.

In an embodiment, the one or more annotations generated by the AI engine may comprise one or more product location coordinates, one or more product shapes, and one or more product categories of the retail product.

In another aspect, the present disclosure relates to a method for providing one or more photorealistic synthetic images of a retail product. That method includes receiving, by one or more processors, one or more input parameters from one or more computing devices using a configuration template. The one or more computing devices may be associated with one or more users and may be connected to the one or more processors through a network. The one or more input parameters may be indicative of one or more images of the retail product provided by the one or more users through the one or more computing devices. The method may include extracting, by the one or more processors, a first set of attributes from the one or more input parameters. The first set of attributes may be indicative of one or more configuration parameters of the retail product. The method may further include extracting, by the one or more processors, a second set of attributes based on the first set of attributes. The second set of attributes may be indicative of one or more retail product meshes based on the one or more configuration parameters of the retail product. The method may include extracting, by the one or more processors, a third set of attributes based on the second set of attributes. The third set of attributes may be indicative of one or more digital twins based on the one or more retail product meshes of the retail product. Also, the method may include generating, by the one or more processors, based on the first set of attributes, the second set of attributes, and the third set of attributes, a rendered model through an AI engine. The AI engine may be configured to use one or more techniques to generate the rendered model. The method may include generating, by the one or more processors, the one or more photorealistic synthetic images and one or more annotations for the retail product based on the rendered model.

In an embodiment, the method may include generating, by the one or more processors, a texture map from the one or more retail product meshes and generating the one or more digital twins of the retail product based on the texture map.

In an embodiment, the method may include generating, by the one or more processors, the one or more photorealistic synthetic images associated with the one or more annotations of the retail product through the AI engine. The AI engine may use one or more techniques that include one or more alpha-blending based techniques that perform domain randomization of the one or more digital twins to generate the one or more photorealistic synthetic images associated with the one or more annotations of the retail product.

In an embodiment, the method may include generating, by the AI engine, one or more 3D realistic scenes using the one or more alpha-blending based techniques. In an embodiment, the method may include simulating, by the AI engine, the one or more 3D realistic scenes to generate the one or more photorealistic synthetic images of the retail product.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes the disclosure of electrical components, electronic components or circuitry commonly used to implement such components.

Figure 1:
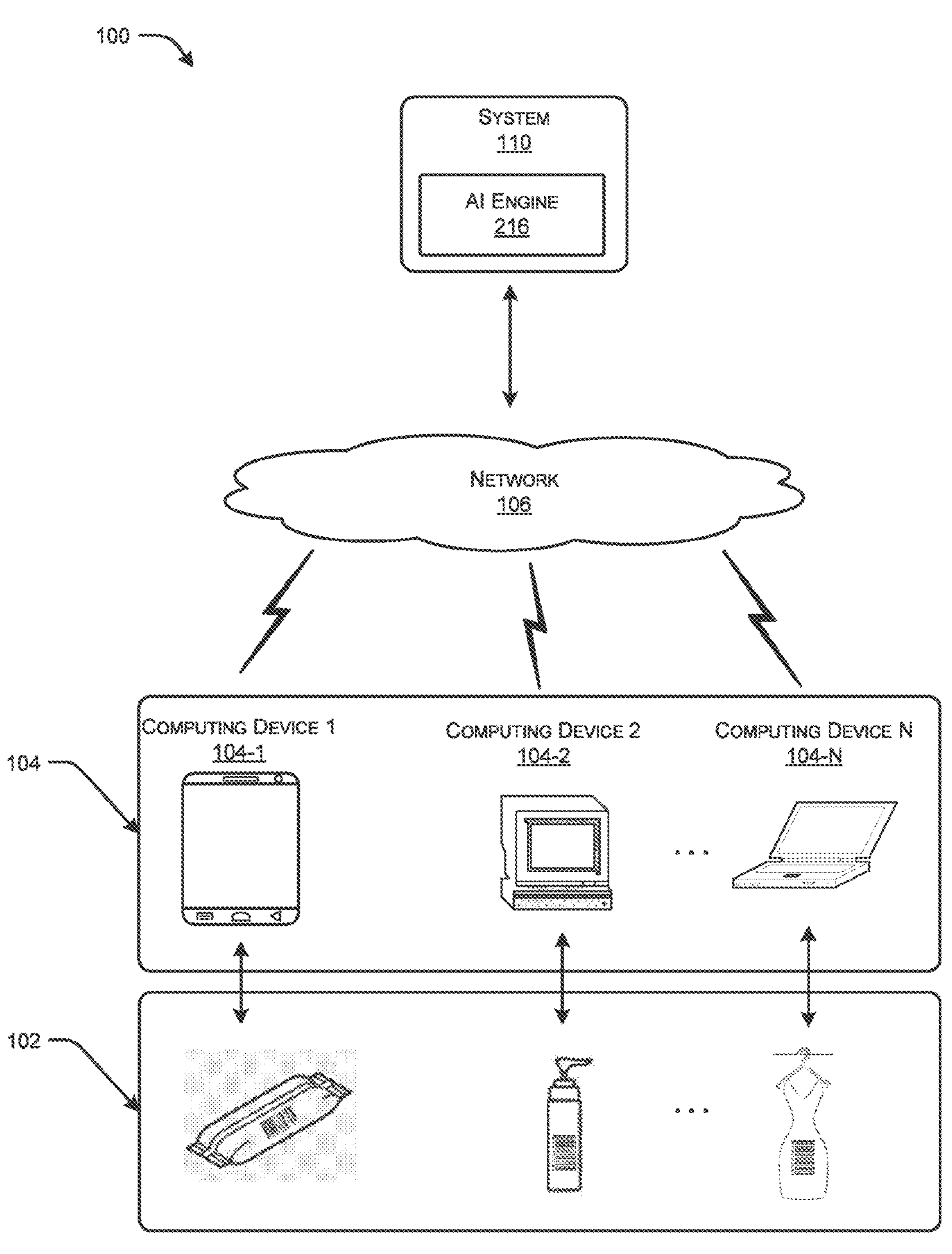
FIG. 1 illustrates an exemplary architecture (100) of a proposed system (110), in accordance with an embodiment of the present disclosure.

The foregoing shall be more apparent from the following more detailed description of the disclosure.

BRIEF DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive in a manner similar to the term "comprising" as an open transition word without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

FIG. 1 illustrates an exemplary network architecture (100) of a system (110), in accordance with an embodiment of the present disclosure. As illustrated in FIG. 1, plurality of computing devices (104-1, 104-2 . . . 104-N) herein referred as computing devices (104) may be connected to the system (110) through a network (106). One or more users (herein referred as users) may provide one or more input parameters indicative of one or more images of a retail product(s) 102 through the computing devices (104). The system (110) may include an artificial engine (AI) engine (216) for generating a rendered model for the retail product.

In an embodiment, the computing devices (104) may communicate with the system (110) through a set of executable instructions residing on any operating system. The computing devices (104) may include, but is not limited to, any electrical, electronic, electro-mechanical, or an equipment, or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device. The computing devices (104) may include one or more in-built or externally coupled accessories including, but not limited to, a visual aid device such as camera, audio aid, a microphone, a keyboard, input devices for receiving input from a user such as touch pad, touch enabled screen, electronic pen, and the like. It may be appreciated that the computing devices (104) may not be restricted to the mentioned devices and various other devices may be used. For example, a smart computing device may be one of the appropriate systems for storing data and other private/sensitive information.

Although FIG. 1 shows exemplary components of the network architecture (100), in other embodiments, the network architecture (100) may include fewer components, different components, differently arranged components, or additional functional components than depicted in FIG. 1. Additionally, or alternatively, one or more components of the network architecture (100) may perform functions described as being performed by one or more other components of the network architecture (100).

Figure 2:
FIG. 2 illustrates an exemplary representation (200) of the system (110), in accordance with an embodiment of the present disclosure.
Figure 2:
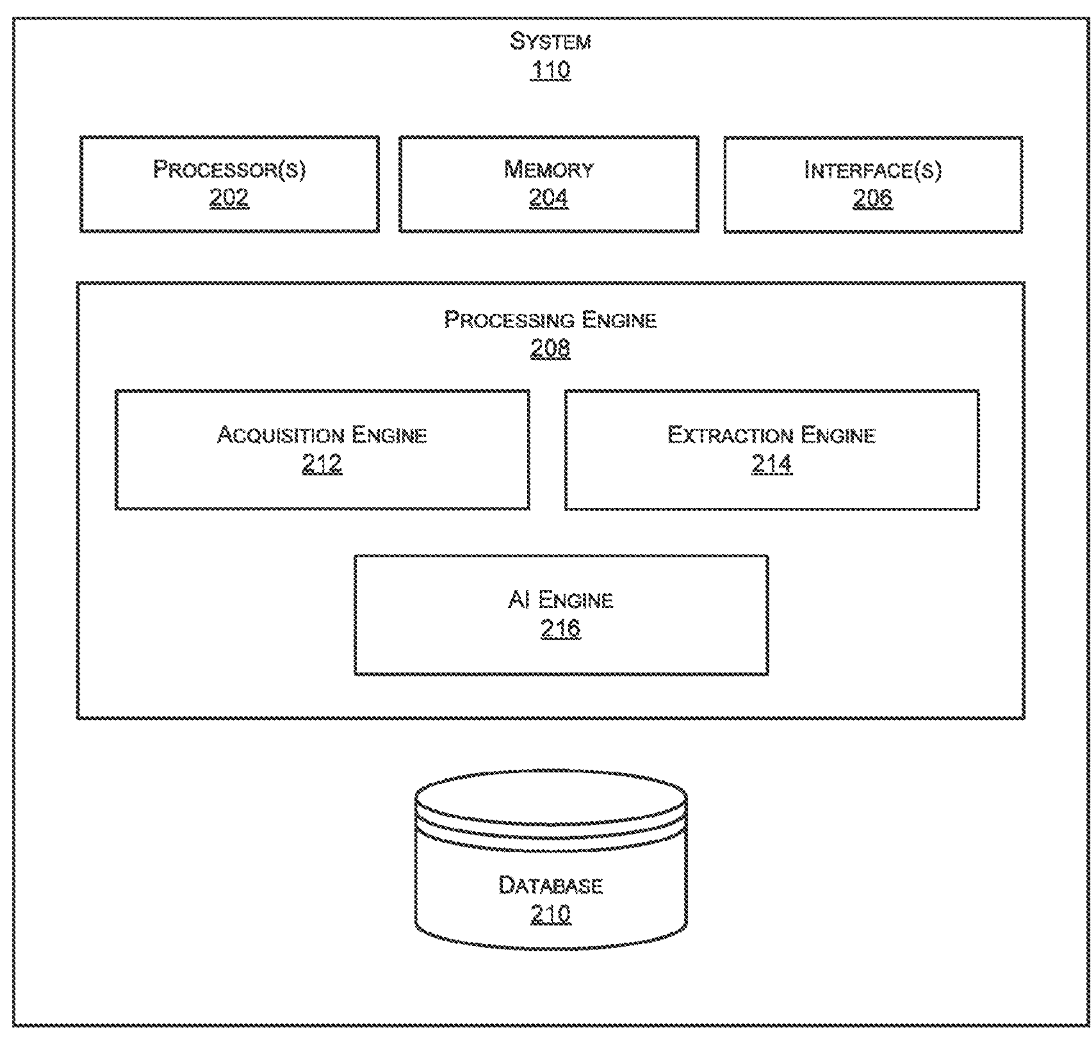

FIG. 2 illustrates an exemplary representation (200) of the system (110), in accordance with an embodiment of the present disclosure. A person of ordinary skill in the art will understand that the system (110) of FIG. 2 may be similar to the system (110) of FIG. 1 in its functionality.

In an aspect, the system (110) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as random-access memory (RAM), or non-volatile memory such as erasable programmable read only memory (EPROM), flash memory, and the like.

In an embodiment, the system (110) may include an interface(s) (206). The interface(s) (206) may comprise a variety of interfaces, for example, interfaces for data input and output devices, referred to as input/output (I/O) devices, storage devices, and the like. The interface(s) (206) may facilitate communication through the system (110). The interface(s) (206) may also provide a communication pathway for one or more components of the system (110). Examples of such components include, but are not limited to, processing engine(s) (208) and a database (210).

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor-executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may comprise the machine-readable storage medium storing the instructions and the processing resource to execute the instructions, or the machine-readable storage medium may be separate but accessible to the system (110) and the processing resource. In other examples, the processing engine(s) (208) may be implemented by electronic circuitry.

In an embodiment, the one or more processor(s) (202) are configured to receive one or more input parameters from one or more computing devices in a network, such as the one or more computing devices (104) in the network (104) of FIG. 1, using a configuration template. The processing engine (208) may include one or more engines selected from any of an acquisition engine (212), an extraction engine (214), and an AI engine (216). A person of ordinary skill in the art will understand that the AI engine (216) of FIG. 2 may be similar to the AI engine (216) of FIG. 1 in its functionality.

In an embodiment, the acquisition engine (212) may receive the one or more input parameters from the computing devices (104) using a configuration template. The one or more input parameters may be indicative of one or more images of a retail product provided by users, such as the users (102) of FIG. 1 through the computing devices (104).

In an embodiment, the extraction engine (214) may extract a first set of attributes from the one or more input parameters and store the first set of attributes in the database (210). The first set of attributes may be indicative of one or more configuration parameters of the retail product. Further, the extraction engine (214) may extract a second set of attributes based on the first set of attributes and store the second set of attributes in the database (210). The second set of attributes may be indicative of one or more retail product meshes based on the one or more configuration parameters of the retail product. In an embodiment, the one or more configuration parameters may include, but not be limited to, any or a combination of a product identification (ID), a product dimension, a product texture, a product class, and a product shape class. In an embodiment, the product dimension may include, but not be limited to, any or a combination of a length, a width, and a height of the retail product. In an embodiment, the product shape class may include, but not be limited to, any or a combination of a cube, a cuboid, a cone, a torus, a sphere, an oval, a cylinder, and a pyramid.

Further, the extraction engine (214) may extract a third set of attributes based on the second set of attributes and store the third set of attributes in the database (210). The third set of attributes may be indicative of one or more digital twins based on the one or more retail product meshes of the retail product. Based on the first set of attributes, the second set of attributes, and the third set of attributes, the one or more processor(s) (202) may generate a rendered model through the AI engine (216). Further, the AI engine (216) may be configured to use one or more techniques. The one or more processors (202) may generate the one or more photorealistic synthetic images and one or more annotations for the retail product based on the rendered model. Further, the one or more processors (202) may be configured to generate a texture map from the one or more retail product meshes and generate the one or more digital twins of the retail product.

In an embodiment, the one or more techniques used by the AI engine (216) may include, but not be limited to, one or more alpha-blending based techniques that perform domain randomization of the one or more digital twins to generate the one or more photorealistic synthetic images and the one or more annotations of the retail product. Further, the AI engine (216) may be configured to generate one or more 3D realistic scenes using the one or more alpha-blending based techniques. Additionally, the AI engine (216) may simulate the one or more 3D realistic scenes to generate the one or more photorealistic synthetic images of the retail product. In an embodiment, the one or more photorealistic synthetic images generated by the AI engine (216) may include, but not be limited to, a red, green and blue (RGB) image, a depth image, and one or more segmentation maps of the retail product. Further, the one or more annotations generated by the AI engine (216) may include, but not be limited to, one or more product location coordinates, one or more product shapes, and one or more product categories of the retail product.

A person of ordinary skill in the art will appreciate that the exemplary representation (200) may be modular and flexible to accommodate any kind of changes in the system (110). In an embodiment, the data may get collected meticulously and deposited in a cloud-based data lake to be processed to extract actionable insights. Therefore, the aspect of predictive maintenance can be accomplished.

Figure 3:
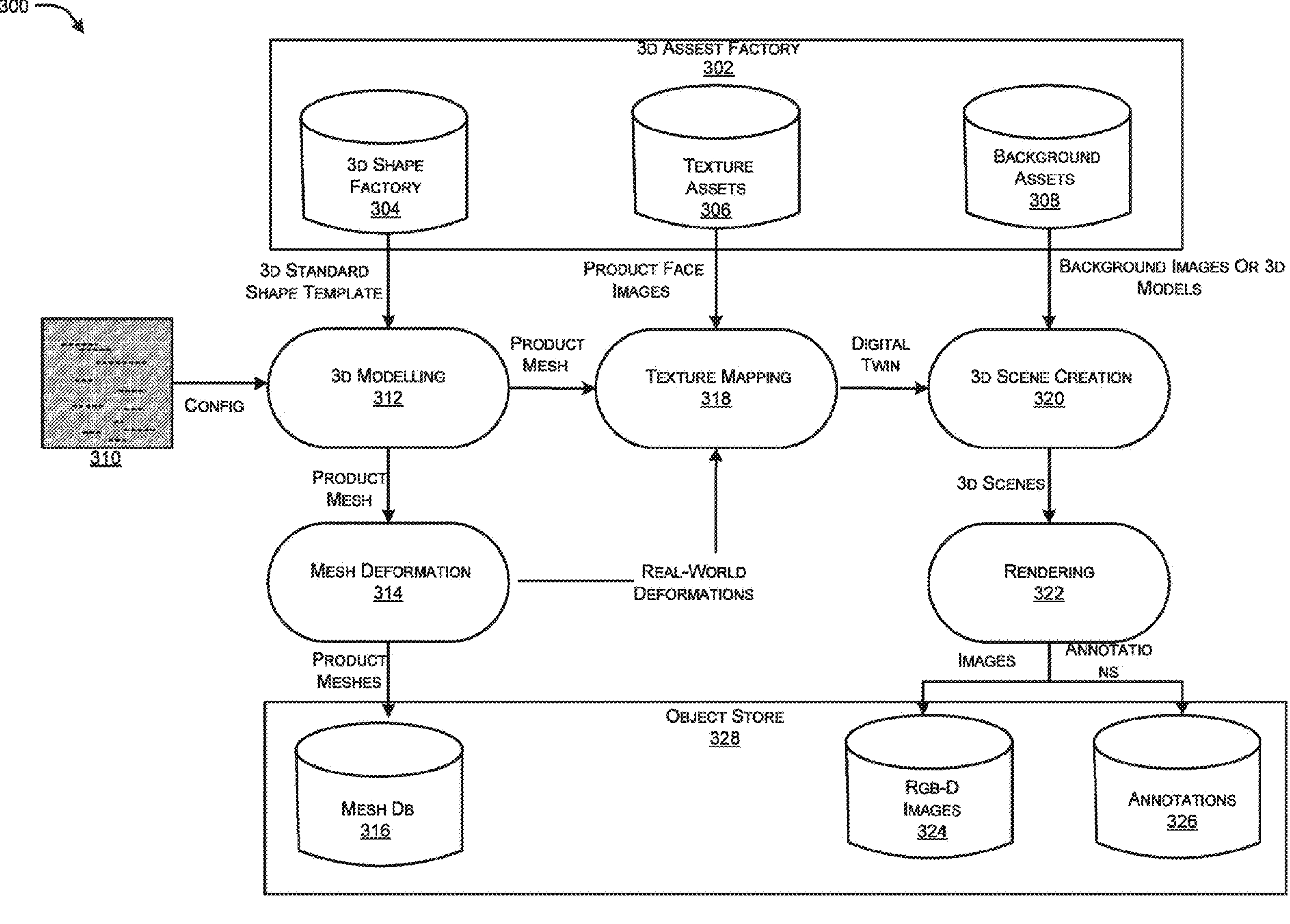
FIG. 3 illustrates an exemplary representation (300) of key components associated with the proposed system (110), in accordance with an embodiment of the present disclosure.

FIG. 3 illustrates an exemplary representation (300) of key components associated with the proposed system (110), in accordance with an embodiment of the present disclosure.

As illustrated in FIG. 3, the key components may include at least six modules. A 3D asset factory (302) may create and store a 3D asset which helps in simulating a real environment for synthetic data generation. There can be many assets such as, but not limited to, a 3D shape factory (304) that may contain standard 3D shapes templates. These shapes serve as the skeleton of meshes which may take different forms according to an input length, width, and height from a configuration template for a retail product. The basic shapes may include, but not be limited to, a cube, a cuboid, a cone, a torus, a sphere, an oval, a cylinder, a pyramidal, and the like.

The texture assets (306) may contain images of all 6 face images of the retail product. These faces may be encoded in a sequential order with respect to the product and transformed into atlas images. The background assets (308) may mainly consist of either RGB images such as, but not limited to, newspaper images, indoor scene images, or irregular pattern images. The background assets (308) may further contain 3D models of environments such as, but not limited to, entire retail store, racks, shelves, conveyor, and the like. An object store (328) may contain meshes at different levels of processing such as product meshes, deformed meshes, and textured meshes (316). The object store (328) may further contain image data synthetically generated from a RGB-D images (324) and annotation data (326) in a java script object notation (JSON) format for supporting object localization, classification, segmentation, and multi-attribute extraction learning.

In an exemplary embodiment, a 3D retail simulator module (300), such as the exemplary representation (300) may comprise a 3D modelling module (312), a texture mapping module (318), and a 3D scene creation module (320). The 3D retail modelling module (312) aims to create multi-resolution cuboid meshes of the retail product. The 3D modelling unit (312) takes input as a JSON file (310), and according to the configuration parameters, first selects the 3D shape template according to the product shape descriptor (class), and then transforms the 3D mesh template to the retail product meshes in exact dimension and shapes. The config json file mainly includes the following information:

Product identification (ID): A unique identifier number for each of the product class.

Product dimension: This records an approximate physical measurement (length L, breadth B, height H) of each product in centimetre scale. This information helps in modelling the standard 3D meshes to the defend shape of the product.

Product textures: It includes the path of the texture files for each of the products. It captures and stores 6 images (cropped) from all 6 faces of a real product. These images are further converted into texture files and associated with the product identification (ID).

Product class: It refers to the class or category of the retail product.

Product shape class: The product shape class refers to the category of the shape of the product. Depending upon the shape, the product shape class may be classified and assigned a shape class identification (ID). Each object may be assigned a shape class identification (ID) from an existing 3D shape factory.

In an exemplary implementation, once the format of configuration file is created, the 3D modelling module (312) may select the desired 3D shape from the 3D shape factory (304), consider the mesh grid matrix for X, Y, Z dimensions, and transform the standard mesh template according to the product dimension. The employed technique for mesh transformation may convert the standard shape class mesh to the retail product class shape, and store the retail product digital twin in the 3D mesh database (316).

In an exemplary embodiment, a mesh deformation module (314) may distort the surface of the mesh generated for simulating the real-world views and mimicking the non-rigid structures of the retail products. The texture mapping module (318) may create textures from a set of images of all the 6 faces, and the product mesh is obtained from the 3D modelling module (312).

In an exemplary embodiment, a 3D scene creation module (320) may simulate various 3D scenes with different combinations of background and foreground objects obtained from the background assets module (308). A rendering module (322) may aim to create photorealistic synthetic images by rendering the 3D scenes in different environmental conditions. The rendering module (322) first loads the 3D scene from the 3D scene creation module (320) to a rendering environment. Further, the rendering module (322) applies random translation and rotation to a camera such that foreground objects are in camera view frustum. Further, the rendering module (322) adds random lights and material properties to generate rendering of the camera view. Furthermore, the rendering module (322) also handles two kinds of variations in the scene rendering, (1) photometric variations (controlling the illumination conditions, lighting, hue space, blur scale, and noise for each rendering), and (2) geometric distortions (translation, rotation, zoom, perspective transforms, etc.). Finally, the renderings contain high definition RGB images, depth images, and segmentation maps. For each rendered image, the rendering module (322) also generates automated annotations such as bounding boxes, boundary polygons, class labels, and other meta information that may help in various computer vision applications.

In an exemplary embodiment, the present disclosure may include the steps of creating a config file (310) by users, such as the users (102) of FIG. 1. Further, the present disclosure may include identifying and storing information for each retail product. Information such as, but not limited to, product identification (ID), product class, product dimensions (L, B, H), product face images (path of the images), and product approximation may be provided in the config file (310). The shape class (cuboidal, cubical, oval, cylindrical, etc.) can also be defined for the retail products.

In an exemplary embodiment, the 3D retail profiler module or 3D modelling (312) may take the input config file (310) and may first select the 3D shape template according to the product shape descriptor (shape class). Additionally, the 3D retail profiler module (312) may transform the 3D mesh template to the retail product meshes in the exact dimension and shapes.

In an exemplary embodiment, once the product mesh is generated by the 3D retail profiler module (312), the mesh deformation module (314) may take the product meshes and perform deformation on the product meshes. Further, the 3D retail profiler module (312) may incorporate perturbations on the z-axis of the meshes by applying thin-plate spline techniques. The mesh database (316) may store the transformed product meshes and deformed meshes for further processing. The generated product meshes and the deformed meshes may be further sent to the texture mapping module (318) for creating realistic 3D models of the retail products. The texture mapping module (318) may receive inputs such as the product meshes and the texture atlas file from the 3D asset factory (302) for each product. Further, the texture mapping module (318) may compute the bi-dimensional UV texture coordinates for all faces of the mesh. The texture file can then directly be imported on the product meshes that results in creation of product 3D model or digital twins.

In an exemplary embodiment, the 3D scene creation module (320) may consider the product 3D models (digital twins) generated from the texture mapping module (318) as foreground and configure different background assets from the 3D asset factory (302) for creating 3D scenes. The foreground creation process may augment the retail product 3D models (digital twins) with additional information attributes such as barcode patches, logos, tags, and other visual or textual information (such as maximum retail price (MRP) tags, net weight, etc.).

In an exemplary embodiment, once the 3D scenes are created, the rendering module (322) may simulate complex rotations, pose variations, illuminations conditions, and occlusions in the scenes. Additionally, the rendering module (322) may output high-quality photorealistic synthetic images with automated annotations for domain-specific tasks. The images may be rendered in three formats: (1) RGB image, (2) depth image, and (3) segmentation maps. The automated annotations created for each rendered file supports JSON format. Further, the rendering module (322) may allow to capture product location coordinates (bounding boxes), product shapes (segmentation polygons), product category (class), and annotations. Additionally, relevant attributes such as barcode, QR code, net volume information, nutritional ingredient information may also be included. Finally, the generated images (RGBD) (324) and the annotations (JSON) (326) may be further dumped in an object store for machine learning (ML) model training.

Although FIG. 3 shows exemplary components of the representation (300), in other embodiments, the representation (300) may include fewer components, different components, differently arranged components, or additional functional components than depicted in FIG. 3. Additionally, or alternatively, one or more components of the representation (300) may perform functions described as being performed by one or more other components of the representation (300).

Figure 4:
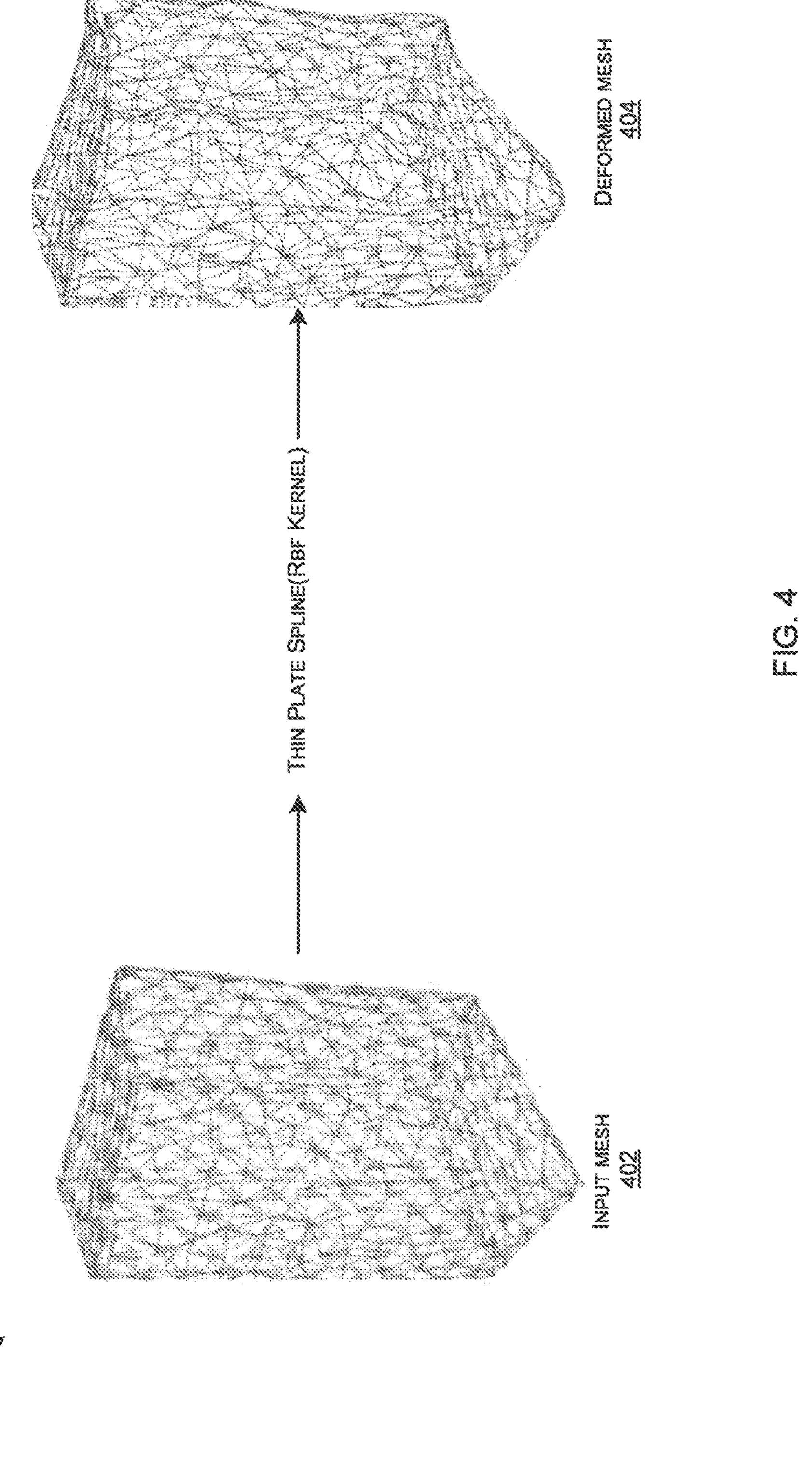
FIG. 4 illustrates an exemplary mesh deformation representation (400), in accordance with an embodiment of the present disclosure.

FIG. 4 illustrates an exemplary mesh deformation representation (400), in accordance with an embodiment of the present disclosure. As illustrated, the mesh deformation module (400) may be configured to distort a surface of an input mesh (402) for simulating real-world views and mimicking non-rigid structures of retail products. The created product meshes may be further processed for selecting control points (selected vertices of the mesh at z-axis) for each of the faces of the mesh. These control points may be carefully selected to define the degree of deformation in the product. To do so, the mesh deformation module (400) may employ a thin plate spline-based technique(s) to produce a deformed mesh (404). This may be achieved by perturbing z-axis of the meshes using radial basis function (RBF).

Figure 5:
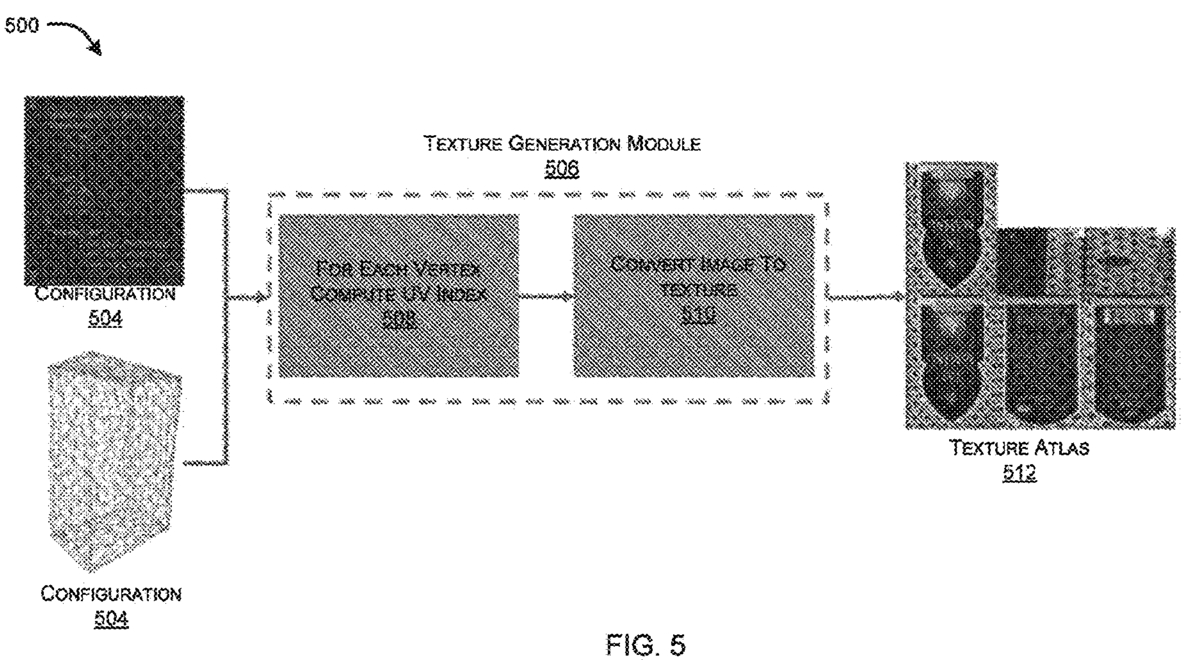
FIG. 5 illustrates an exemplary representation of a texture mapping module (500), in accordance with an embodiment of the present disclosure.

FIG. 5 illustrates an exemplary representation of a texture generation module (500), in accordance with an embodiment of the present disclosure. As illustrated, the texture generation module (500) may first take the product mesh/configuration (504) and compute UV texture coordinates (508) for all faces of the mesh. The texture generation module (500) may further compute UV texture indices in such a way that each face of the mesh may occupy a fixed position in a texture map. Further, the texture generation module (500) may resize images to span the computed texture map for each face and output the texture image (510) and a texture atlas (512). The texture image (510) and the texture atlas (512) may be compatible with object format and may be further acceptable in different simulation engines such as blender, unreal engine, or unity. The texture atlas (512) may then directly be imported on the product meshes to create product 3D model or digital twins.

Figure 6:
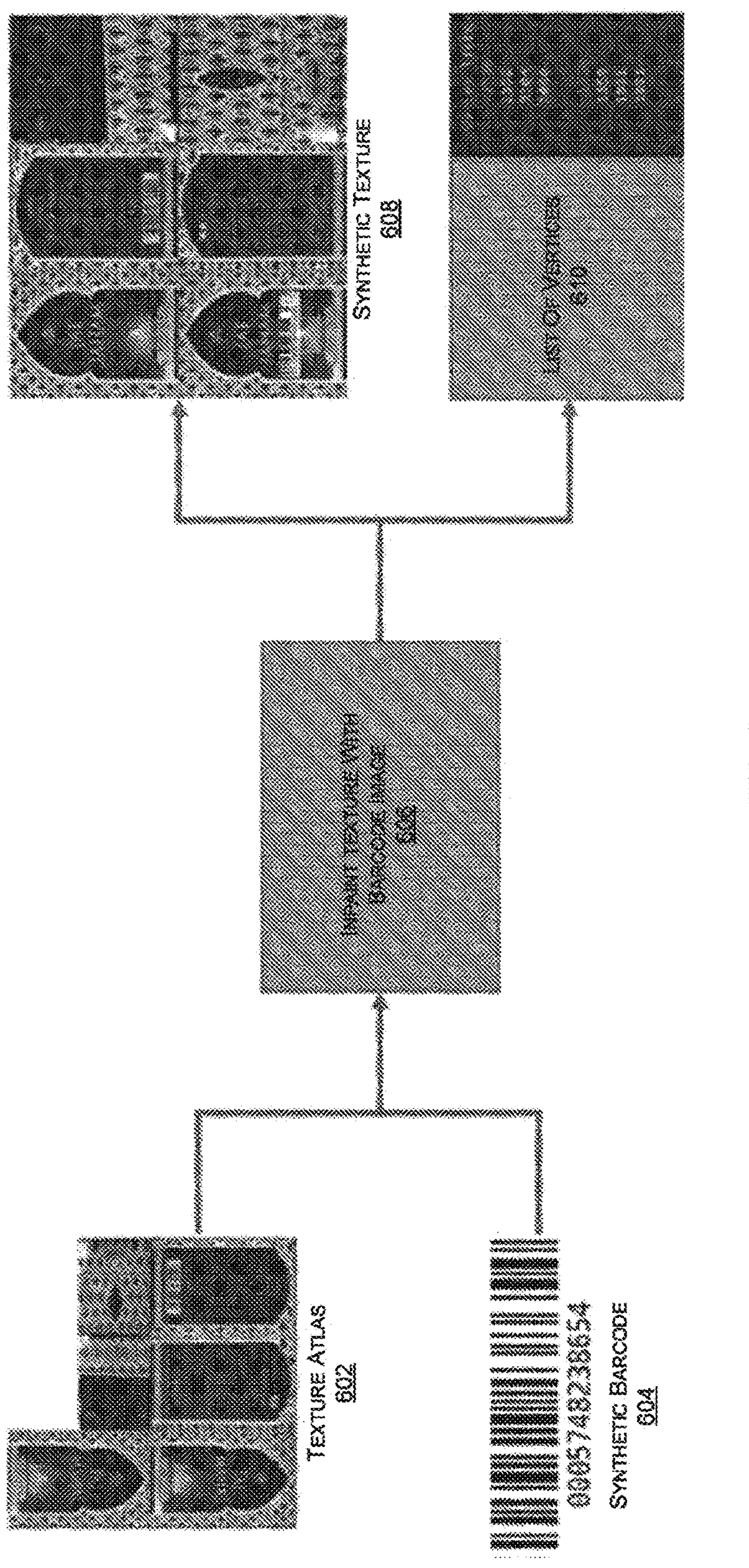
FIG. 6 illustrates an exemplary representation of a scene creation module (600), in accordance with an embodiment of the present disclosure.

FIG. 6 illustrates an exemplary representation of a scene creation module (600), in accordance with an embodiment of the present disclosure. As illustrated, the scene creation module (600) may simulate various 3D scenes with different combinations of background and foreground objects obtained from a 3D asset factory, such as the 3D asset factory (302) of FIG. 3. In order to generate 3D scenes, foreground creation may be required. Foreground models are mainly the retail product 3D models (or digital twins) which are added with different background models to create the 3D scene. The texture of these 3D products may be further augmented with additional information attributes such as barcode patches, logos, tags, and other visual or textual information such as MRP tags, net weight, etc. To do so, an in paint texture with barcode image module (606) may facilitate the addition of image patches across different faces on the product texture. First, the in paint texture with barcode image module (606) may receive a texture atlas (602) and a synthetic barcode (604) as inputs. Further, the in paint texture with barcode image module (600) may generate a synthetic texture (608) and a list of vertices (610) as outputs.

In an exemplary implementation, domain randomization may further be required for generating the 3D scene. The domain randomization provides the generalization capabilities to the data generation process in order to bridge the gap between synthetic simulation and the real-world data. The domain randomization may employ alpha-blending based techniques to blend the foreground or retail product to different backgrounds. The background model may consist of RGB images such as newspaper images, indoor scene images, and irregular pattern images. Additionally, the background model may further contain 3D models of the environments such as entire retail store, racks, shelves, conveyor, and the like.

The advantages of domain randomization can be twofold. Firstly, domain randomization may help in simulating 3D scenes. Further, the domain randomization may place each product with heterogeneous background models in order to make the data background agnostic and with high variance. This further may help in improving the generalization capabilities of the ML models. On the other hand, domain randomization may also help in creating domain-specific data by selecting or simulating exact 3D background models. This may further allow the ML models to learn domain-specific tasks.

Figure 7:
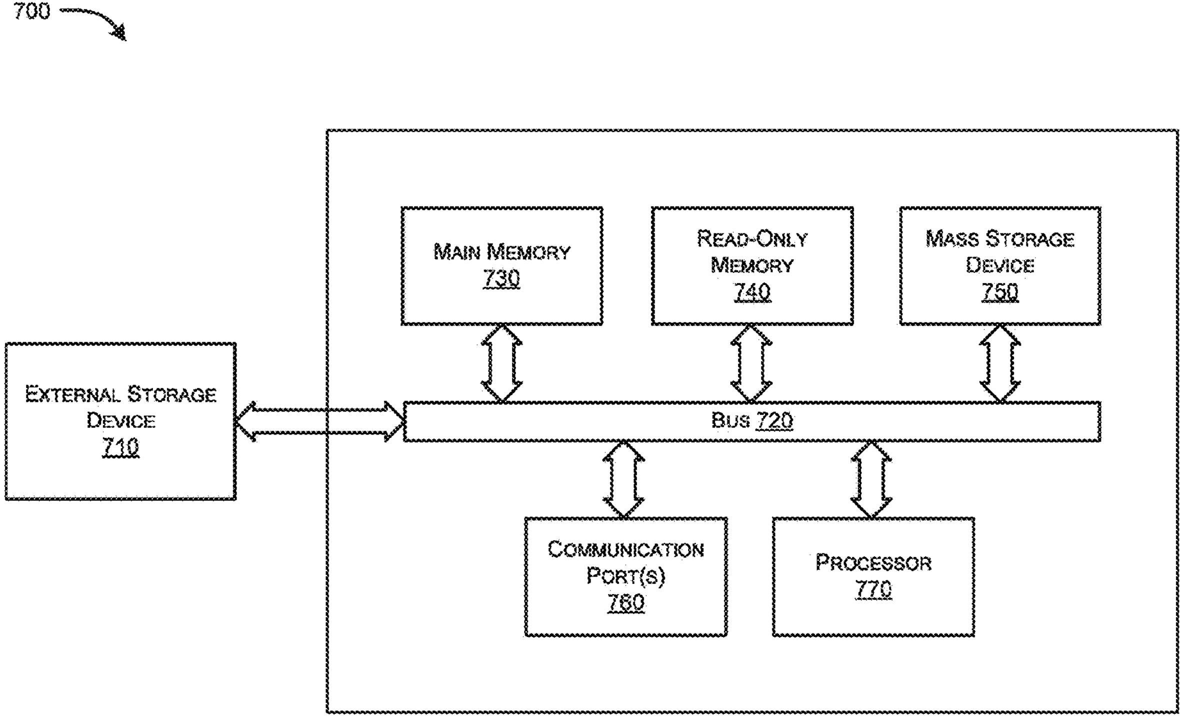
FIG. 7 illustrates an exemplary computer system (700) in which or with which embodiments of the present disclosure may be implemented.

FIG. 7 illustrates an exemplary computer system (700) in which or with which embodiments of the present disclosure may be implemented. As shown in FIG. 7, the computer system (700) may include an external storage device (710), a bus (720), a main memory (730), a read-only memory (740), a mass storage device (750), a communication port(s) (760), and a processor (770). A person skilled in the art will appreciate that the computer system (700) may include more than one processor and communication ports. The processor (770) may include various modules associated with embodiments of the present disclosure. The communication port(s) (760) may be any of an RS-272 port for use with a modem-based dialup connection. The processor (770) may include a 10/100 Ethernet port, a Gigabit or 10 Gigabit port using copper or fibre, a serial port, a parallel port, or other existing or future ports. The communication port(s) (760) may be chosen depending on a network, such a Local Area Network (LAN), Wide Area Network (WAN), or any network to which the computer system (700) connects. The main memory (730) may be Random Access Memory (RAM), or any other dynamic storage device commonly known in the art. The read-only memory (740) can be any static storage device(s) e.g., but not limited to, a Programmable Read Only Memory (PROM) chips for storing static information e.g., start-up or basic input-output system (BIOS) instructions for the processor (770). The mass storage device (750) may be any current or future mass storage solution, which can be used to store information and/or instructions. Exemplary mass storage device (750) includes, but is not limited to, parallel advanced technology attachment (PATA) or serial advanced technology attachment (SATA) hard disk drives or solid-state drives (internal or external, e.g., having Universal Serial Bus (USB) and/or Firewire interfaces).

Optionally, operator and administrative interfaces, e.g. a display, keyboard, and a cursor control device, may also be coupled to the bus (720) to support direct operator interaction with the computer system (700). Other operator and administrative interfaces may be provided through network connections connected through the communication port(s) (760). In no way should the aforementioned exemplary computer system (700) limit the scope of the present disclosure.

Thus, the present disclosure provides for a unique and efficient system that has the following advantages:

User-friendly: The present disclosure provides an automated, unified, and complete configuration-driven framework where users need not to work on separate platforms for 3D reconstruction rendering. It allows the users to install and run the synthetic generation pipelines with simple command line interface (CLI). Moreover, the users just need to change the configuration parameters and the system will be able to generate data and annotations in no time.

Data security and privacy concerns: The proposed synthetic data generation system addresses and reduces the issues of data security, privacy, and confidentiality to a large extent by avoiding or minimizing the acquisition, storage, or usage of real data, places, or environments.

Scalability: The present system is able to generate good quality 3D models for a wide range of retail products ranging from 50 kg flour packets to 0.1 kg chocolate packs, opaque to transparent products, dark to glossy items, and other hard examples. Moreover, the system also handles large-scale data production for retail products in various use-case scenarios and environments. Depending upon the settings of the configuration file (parameters of products meshes, deformation, scene creation, and environmental conditions), the system may explore all the possible combinations of the settings and generate millions of domain-specific annotated synthetic data for retail products.

Quality: The quality of retail synthetic data generation system can be measured as the following explained below:

Data quality: The system may render high quality RGB images (varying resolution and pixels per inch (ppi)), depth images, and segmentation maps with pixel-level accuracy.

Data distribution: The system may employ uniform distribution in order to sample and generate multi-class multi-modal data with particular emphasis on creation diverse, tough, realistic, and unbiased datasets.

Low computational cost: The system requires less computational resources compared to the other existing systems due to the fact that the disclosed framework does not require depth sensor data (or RGB-D data) in order to create 3D models. Rather, the 3D modelling process is initialized with stored template mesh shape class and product configuration parameters to generate high quality 3D models. Additionally, employed domain randomization-based techniques help in programmatically optimizing the permutations of the configuration parameters for the data generation process which make rendering processes faster.

While considerable emphasis has been placed herein on the preferred embodiments, it will be appreciated that many embodiments can be made and that many changes can be made in the preferred embodiments without departing from the principles of the disclosure. These and other changes in the preferred embodiments of the disclosure will be apparent to those skilled in the art from the disclosure herein, whereby it is to be distinctly understood that the foregoing descriptive matter to be implemented merely as illustrative of the disclosure and not as limitation.

Advantages of the Invention

The present disclosure provides a system and a method that uses a 3D vision-based approach to automatically create 3D models (digital twins) of retail products.

The present disclosure provides a system and a method that incorporates domain randomization and in painting-based techniques to blend products in different backgrounds specific to an application domain.

The present disclosure provides a system and a method that employs physics-based simulations for creating realistic 3D scenes by managing the products, occluding materials, and background, environmental conditions (illumination, blur, noise, orientation, pose, height, motion, etc.)

The present disclosure provides a system and a method that uses python-based pipeline (blender) for rendering high quality realistic synthetic data (RGB and depth images).

The present disclosure provides a system and a method that supports automated annotation service for variety of artificial intelligence/machine learning (AI/ML) tasks such as object detection, tracking, segmentation, and multi class classification.

The present disclosure provides a system and a method that is user-friendly.

The present disclosure provides a system and a method that addresses data security and privacy concerns.

The present disclosure provides a system and a method that is scalable.

The present disclosure provides a system and a method that provides good data quality while generating a low computational cost.

We claim:

1. A system for providing one or more photorealistic synthetic images of a retail product, said system comprising:
- one or more processors operatively coupled to one or more computing devices, the one or more processors coupled with a memory, wherein said memory stores instructions which when executed by the one or more processors causes the one or more processors to:
  - receive one or more input parameters from the one or more computing devices using a configuration template, wherein the one or more computing devices are associated with one or more users, and are connected to the one or more processors through a network,
  - wherein the one or more input parameters are indicative of one or more images of the retail product provided by the one or more users through the one or more computing devices;
  - extract a first set of attributes from the one or more input parameters, wherein the first set of attributes are indicative of one or more configuration parameters of the retail product;
  - extract a second set of attributes based on the first set of attributes, wherein the second set of attributes are indicative of one or more retail product meshes based on the one or more configuration parameters of the retail product;
  - extract a third set of attributes based on the second set of attributes, wherein the third set of attributes are indicative of one or more digital twins based on the one or more retail product meshes of the retail product;
  - based on the first set of attributes, the second set of attributes, and the third set of attributes, generate a rendered model through an artificial intelligence (AI) engine, wherein the AI engine is configured to use one or more techniques; and
  - generate the one or more photorealistic synthetic images and one or more annotations of the retail product based on the rendered model, wherein the one or more techniques used by the AI engine comprise one or more alpha-blending based techniques that perform domain randomization of the one or more digital twins to generate the one or more photorealistic synthetic images and the one or more annotations of the retail product, and wherein the AI engine is configured to generate one or more three-dimensional (3D) realistic scenes using the one or more alpha-blending based techniques, and simulate the one or more 3D realistic scenes to generate the one or more photorealistic synthetic images of the retail product.

2. The system as claimed in claim 1, wherein the one or more configuration parameters comprise any or a combination of a product identification (ID), a product dimension, a product texture, a product class, and a product shape class.

3. The system as claimed in claim 2, wherein the product dimension comprises any or a combination of a length, a width, and a height of the retail product.

4. The system as claimed in claim 2, wherein the product shape class comprises any or a combination of a cube, a cuboid, a cone, a torus, a sphere, an oval, a cylinder, and a pyramid.

5. The system as claimed in claim 1, wherein the one or more processors are configured to generate a texture map from the one or more retail product meshes, and generate the one or more digital twins of the retail product based on the texture map.

6. The system as claimed in claim 1, wherein the one or more photorealistic synthetic images comprises a red, green, and blue (RGB) image, a depth image, and one or more segmentation maps of the retail product.

7. The system as claimed in claim 1, wherein the one or more annotations comprises one or more product location coordinates, one or more product shapes, and one or more product categories of the retail product.

8. A method for providing one or more photorealistic synthetic images of a retail product, said method comprising:
- receiving, by one or more processors, one or more input parameters from one or more computing devices, wherein the one or more computing devices are associated with one or more users, and are connected to the one or more processors through a network, wherein the one or more input parameters are indicative of one or more images of the retail product provided by the one or more users through the one or more computing devices;

extracting, by the one or more processors, a first set of attributes from the one or more input parameters, wherein the first set of attributes are indicative of one or more configuration parameters of the retail product;

extracting, by the one or more processors, a second set of attributes based on the first set of attributes, wherein the second set of attributes are indicative of one or more retail product meshes based on the one or more configuration parameters of the retail product;

extracting, by the one or more processors, a third set of attributes based on the second set of attributes, wherein the third set of attributes are indicative of one more digital twins based on the one or more retail product meshes of the retail product;

generating, by the one or more processors, based on the first set of attributes, the second set of attributes, and the third set of attributes, a rendered model through an artificial intelligence (AI) engine;

generating, by the one or more processors, the one or more photorealistic synthetic images and one or more annotations of the retail product based on the rendered model;

generating, by the one or more processors through the AI engine, the one or more photorealistic synthetic images associated with the one or more annotations of the retail product using one or more alpha-blending based techniques that perform domain randomization of the one or more digital twins; and generating, by the AI engine, one or more three-dimensional (3D) realistic scenes using the one or more alpha-blending based techniques, and generating the one or more photorealistic synthetic images of the retail product by simulating the one or more 3D realistic scenes.

9. The method as claimed in claim 8, comprising generating, by the one or more processors, a texture map from the one or more retail product meshes, and generating, by the one or more processors, the one or more digital twins of the retail product based on the texture map.

10. A user equipment for providing one or more photorealistic synthetic images of a retail product, said UE comprising:

one or more processors communicatively coupled to one or more processors comprised in a system, the one or more processors coupled with a memory, wherein said memory stores instructions which when executed by the one or more processors causes the UE to:

transmit one or more images of the retail product to the one or more processors using a configuration template, wherein the one or more processors are configured to:

receive one or more input parameters from the UE, wherein the UE is associated with one or more users and is connected to the one or more processors through a network, wherein the one or more input parameters are indicative of the one or more images of the retail product provided;

extract a first set of attributes from the one or more input parameters, wherein the first set of attributes are indicative of one or more configuration parameters of the retail product;

extract a second set of attributes based on the first set of attributes, wherein the second set of attributes are indicative of one or more retail product meshes based on the one or more configuration parameters of the retail product;

extract a third set of attributes based on the second set of attributes, wherein the third set of attributes are indicative of one or more digital twins based on the one or more retail product meshes of the retail product;

based on the first set of attributes, the second set of attributes, and the third set of attributes, generate a rendered model through an artificial intelligence (AI) engine, wherein the AI engine is configured to use one or more techniques; and generate the one or more photorealistic synthetic images and one or more annotations of the retail product based on the rendered model, wherein the one or more techniques used by the AI engine comprise one or more alpha-blending based techniques that perform domain randomization of the one or more digital twins to generate the one or more photorealistic synthetic images and the one or more annotations of the retail product, and wherein the AI engine is configured to generate one or more three-dimensional (3D) realistic scenes using the one or more alpha-blending based techniques, and simulate the one or more 3D realistic scenes to generate the one or more photorealistic synthetic images of the retail product.

* * * * *